(12) United States Patent
Kang et al.

(10) Patent No.: US 12,549,088 B2
(45) Date of Patent: Feb. 10, 2026

(54) ZERO-VOLTAGE AND ZERO-CURRENT SWITCHING CONVERTOR WITH TAPPED INDUCTOR

(71) Applicant: POWER CUBESEMI INC., Seongnam-si (KR)

(72) Inventors: Tai Young Kang, Gwangju-si (KR); Sin Su Kyoung, Hanam-si (KR); Joon Hyeok Jeon, Yongin-si (KR); Lee Eunsoo, Suwon-si (KR); Kim Jaejoon, Anyang-si (KR)

(73) Assignee: POWER CUBESEMI INC., Gyeonggi-Do (KR)

( * ) Notice: Subject to any disclaimer, the term of this patent is extended or adjusted under 35 U.S.C. 154(b) by 155 days.

(21) Appl. No.: 18/515,953

(22) Filed: Nov. 21, 2023

(65) Prior Publication Data

US 2024/0348144 A1    Oct. 17, 2024

(30) Foreign Application Priority Data

Apr. 11, 2023  (KR) .................. 10-2023-0047403

(51) Int. Cl.
  *H02M 3/155*  (2006.01)
  *H02M 1/00*  (2006.01)
  (Continued)

(52) U.S. Cl.
  CPC .......... *H02M 1/0058* (2021.05); *H02M 1/083* (2013.01); *H02M 1/34* (2013.01); *H02M 3/155* (2013.01)

(58) Field of Classification Search
  CPC .............. H02M 1/0058; H02M 1/0048; H02M 1/0051; H02M 1/0054; H02M 1/083;
  (Continued)

(56) References Cited

U.S. PATENT DOCUMENTS

| 2015/0115911 A1* | 4/2015 | Parto ................... H02M 3/158 323/271 |
| 2019/0058389 A1* | 2/2019 | Telefus ............... H02M 3/335 |

FOREIGN PATENT DOCUMENTS

| KR | 101018188 B1 | 2/2011 |
| KR | 1020150047648 | 5/2015 |

OTHER PUBLICATIONS

Bo. H. Choi et al., A Novel Single-SiC-Switch-Based ZVZCS Tapped Boost Converter, IEEE Transactions on Power Electronics, vol. 29, No. 10, Oct. 2014, 14 pages.
(Continued)

*Primary Examiner* — Nguyen Tran
(74) *Attorney, Agent, or Firm* — Grossman, Tucker, Perreault & Pfleger, PLLC; Donald J. Perreault (57) ABSTRACT

Tapped inductor boost converter disclosed. The tapped inductor boost converter include a tapped inductor, having a primary winding, a secondary winding, and a tap connected to a contact point of the primary winding and the secondary winding, a switch for connecting or disconnecting a current path between the tap and ground, a switch control circuit for detecting a zero voltage crossing during resonance with a first duty signal and a voltage across the switch, and outputting a second duty signal that turns off the switch, a snubber circuit connected in parallel with the switch, a clamping diode for providing a forward current path from an output terminal of the snubber circuit to an output terminal of the tapped inductor boost converter, an output diode for providing a forward current path from the output terminal of the tapped inductor to the output terminal of the converter output terminal, and a recovery capacitor connected between the output terminal of the tapped inductor and the output terminal of the snubber circuit.

5 Claims, 9 Drawing Sheets

(51) Int. Cl.
*H02M 1/08* (2006.01)
*H02M 1/34* (2007.01)
(58) Field of Classification Search
CPC .......... H02M 1/08; H02M 1/082; H02M 1/34;
H02M 1/342; H02M 1/344; H02M 1/346;
H02M 1/348; H02M 3/155; H02M
3/1552; H02M 3/1555; H02M 3/1557;
H02M 3/138; H02M 3/137
See application file for complete search history.

(56) References Cited

OTHER PUBLICATIONS

Bo. H. Choi et al., DCM Analysis of Single-Switch-Based ZVZCS Converters With a Tapped Inductor, IEEE Transactions on Power Electronics, vol. 30, No. 12, Dec. 2015, 11 pages.
Jaejoon Kim et al., Single SiC Switch based 10KW PV Boost Converters with ZVZCS Operation, Nov. 25, 2022.

\* cited by examiner

ZERO-VOLTAGE AND ZERO-CURRENT SWITCHING CONVERTOR WITH TAPPED INDUCTOR

FIELD OF INVENTION

The present invention relates to zero-voltage and zero-current switching boost converter.

RELATED ART

Solar power generation is a power generation system that produces electricity using solar energy. PV modules composed of multiple solar cells generate direct current power. Regarding switching loss, which is a loss occurring in power conversion, the prior art requires multiple switches to apply to 10 KW applications and secure efficiency, which results in large switching loss. Conversely, if the number of switches is reduced to reduce switching losses, it is difficult to achieve efficiency.

SUMMARY

The present invention is intended to provide a boost converter that can minimize switching losses.

According to one aspect of the present invention, there is provided a tapped inductor boost converter including a tapped inductor, having a primary winding, one end of which is connected to an input power source, a secondary winding connected between the other end of the primary winding and an output terminal of the tapped inductor, and a tap connected to a contact point of the primary winding and the secondary winding, a switch, configured for connecting or disconnecting a current path between the tap and ground, a switch control circuit, configured for detecting a zero voltage crossing during resonance with a first duty signal and a voltage across the switch, and outputting a second duty signal that turns off the switch, a snubber circuit connected in parallel with the switch, a clamping diode, configured for providing a forward current path from an output terminal of the snubber circuit to an output terminal of the tapped inductor boost converter, an output diode, configured for providing a forward current path from the output terminal of the tapped inductor to the output terminal of the converter output terminal, and a recovery capacitor connected between the output terminal of the tapped inductor and the output terminal of the snubber circuit.

In one embodiment, the resonance occurs when the switch is turned on, and when the first duty signal is turned off during the resonance, the switch control circuit outputs the second duty signal that is turned off at the zero voltage crossing.

In one embodiment, the switch control circuit includes an AND gate, configured for receiving an inverted voltage across the switch and an inverted first duty signal, and a latch having a RESET terminal connected to an output terminal of the AND gate and a SET terminal that receives the first duty signal.

In one embodiment, the snubber circuit includes a snubber diode, configured for providing a forward current path from the tap to the output terminal of the snubber circuit, and a snubber capacitor connected in series to the snubber diode.

In one embodiment, a turn ratio of the tapped inductor is 5, and a capacitance ratio between the snubber capacitor and the recovery capacitor is 1.

In one embodiment, the tapped inductor boost converter performs zero current switching when the switch is turned on and zero voltage switching when the switch is turned off.

The tapped inductor boost converter according to an embodiment of the present invention can reduce costs by using fewer elements than other topologies in boost converters applied to existing 10 kW solar applications, and additionally improves power efficiency, making it possible to reduce costs compared to other boost converter topologies. There is a greater economic advantage.

DESCRIPTION OF EMBODIMENTS

The invention can be modified in various forms and specific embodiments will be described and shown below. However, the embodiments are not intended to limit the invention, but it should be understood that the invention includes all the modifications, equivalents, and replacements belonging to the concept and the technical scope of the invention. In describing the present invention, if it is determined that a detailed description of a related known technology may obscure the gist of the present invention, the detailed description thereof will be omitted.

Terms such as first, second, etc., may be used to refer to various elements, but, these elements should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Figure 1:
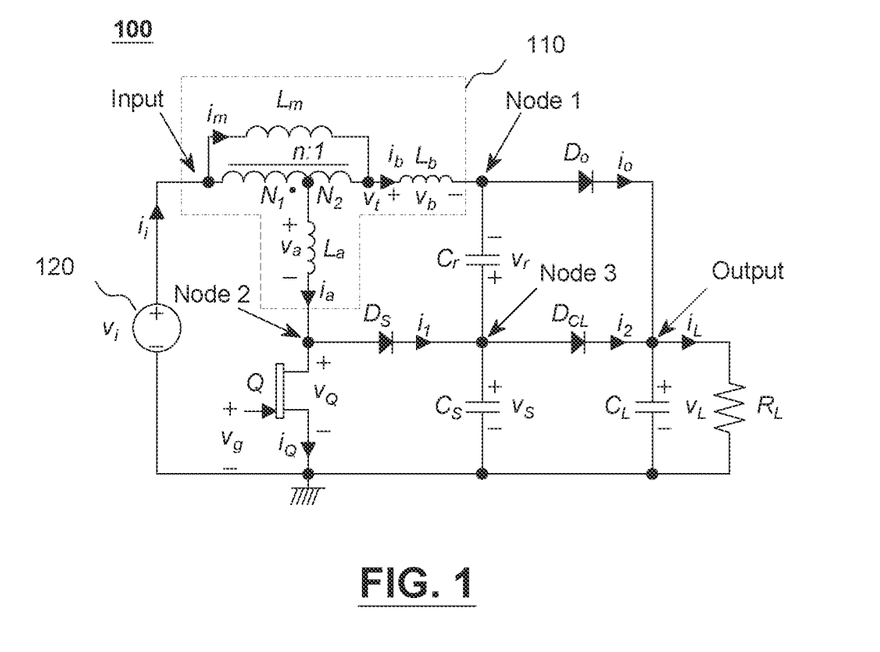
FIG. 1 exemplarily illustrates a tapped inductor boost converter.

FIG. 1 exemplarily illustrates a tapped inductor boost converter.

Referring to FIG. 1, the tapped inductor boost converter 100 may include a tapped inductor 110, a switch Q, a snubber diode $D_S$, a snubber capacitor $C_S$, a clamp diode $D_{CL}$, a recovery capacitor $C_r$, an output diode $D_O$, a load capacitor $C_L$, a load, and a resistance $R_L$. The snubber diode $D_S$, the clamp diode $D_{CL}$, and the output diode $D_O$ are fast recovery diodes, and their switching losses, conduction losses, and reverse recovery switching times are small.

An input terminal of the tap inductor 110 is connected to the input power source 120, an output terminal is connected to the first node, and a tap is connected to the second node. In detail, the tap inductor 110 may include a primary winding with one end connected to the input power source 120, a secondary winding connected between the other end of the primary winding and the first node, and the tap connected to a contact point between the primary winding and the secondary winding. One end of the input power source 120 is connected to the input terminal of the tap inductor 110, and the other end is connected to ground.

The tap is connected to the second node. As illustrated in FIG. 1, the tap inductor 110 can be modeled as an ideal autotransformer having a large magnetizing inductance $L_m$, two small leakage inductances $L_a$ and $L_b$, and a turns ratio of n:1 (n=N1/N2). The tap inductor 110 can limit a current slope during zero current switching (ZCS) with leakage inductances $L_a$ and $L_b$.

Figure 5:
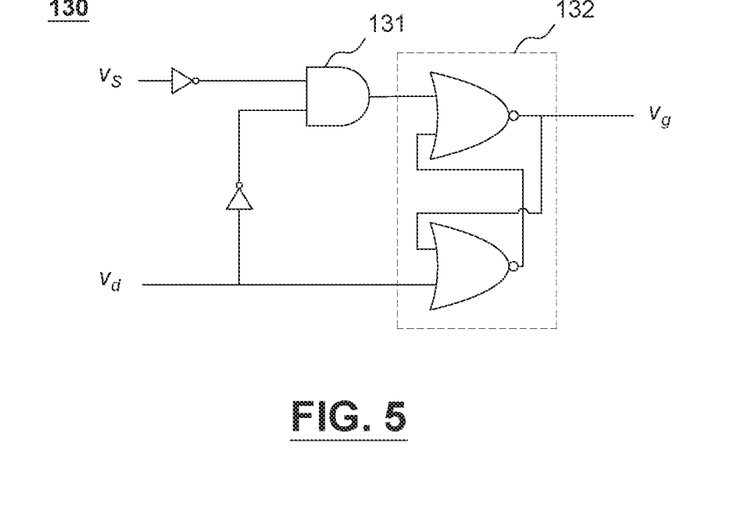
FIG. 5 exemplarily illustrates a switch control circuit that controls the tapped inductor boost converter to turn off ZVC.

The switch Q is connected between the second node and ground, and connects or disconnects a current path between the second node and ground by the second duty signal applied by a switch control circuit 130 (see FIG. 5). At the second node, a drain of the switch Q and the snubber diode $D_S$ are electrically connected to the tap, and a source of the switch Q is connected to ground. The switch Q may be a power semiconductor capable of high-speed switching, for example, SiC MOSFET, SJ MOSFET, and so on. The Switch Q adjusts an output voltage and power based on a current flowing from the input power source 120 to the tap inductor 110.

The snubber diode $D_S$ provides a forward current path from the second node to the third node, and the snubber capacitor $C_S$ is connected to the third node and ground. The third node is an output terminal of a snubber circuit consisting of the snubber diode $D_S$ and the snubber capacitor $C_S$. That is, the snubber circuit is connected in parallel with the switch Q.

The clamp diode $D_{CL}$ provides a forward current path from the third node to an output terminal of the converter 100. The load resistor $R_L$ and the load capacitor $C_L$ are connected in parallel between the output terminal of the converter 100 and ground.

The recovery capacitor $C_r$ is connected between the first node and the third node.

The output diode $D_O$ provides a forward current path from the first node to the output terminal of the converter 100.

Figure 2:
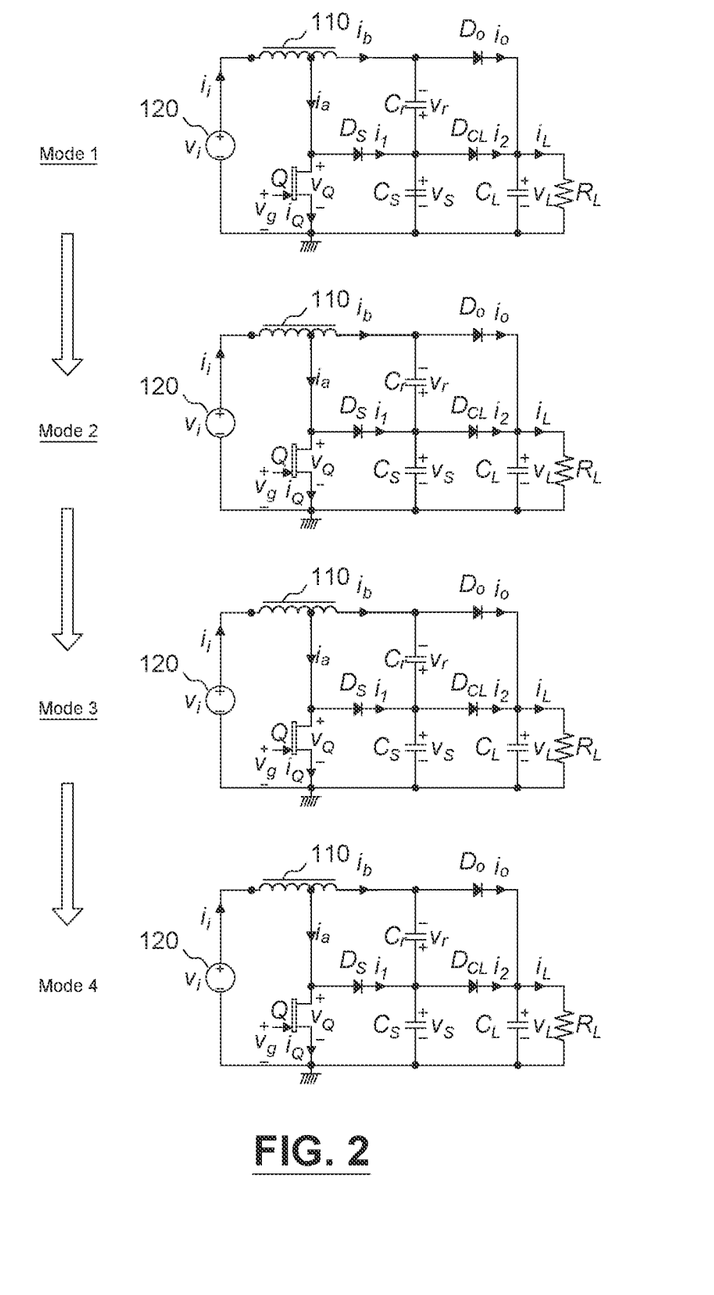
FIG. 2 and FIG. 3 exemplarily illustrate a switching operation of the tapped inductor boost converter.
Figure 3:
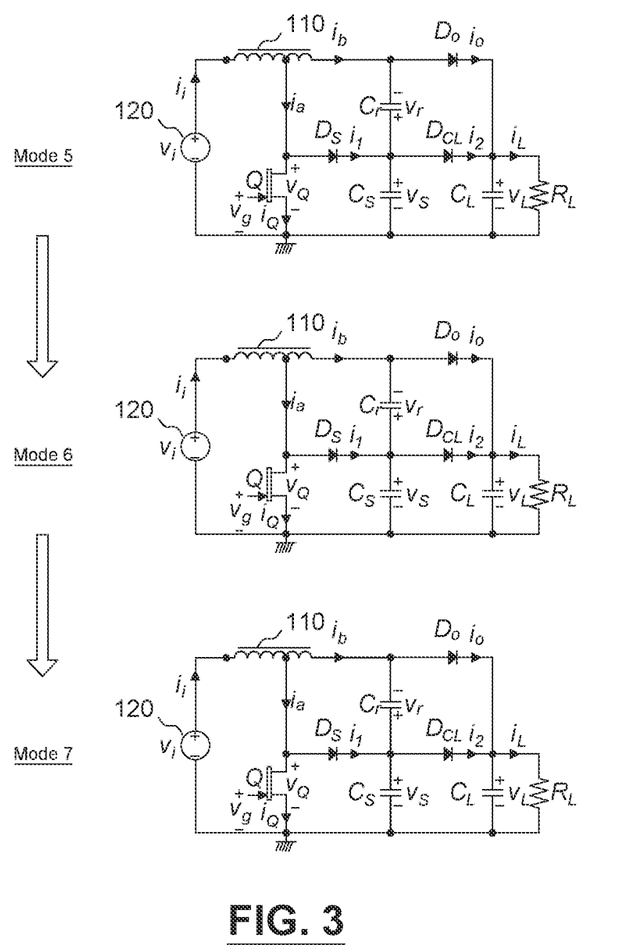
Figure 4:
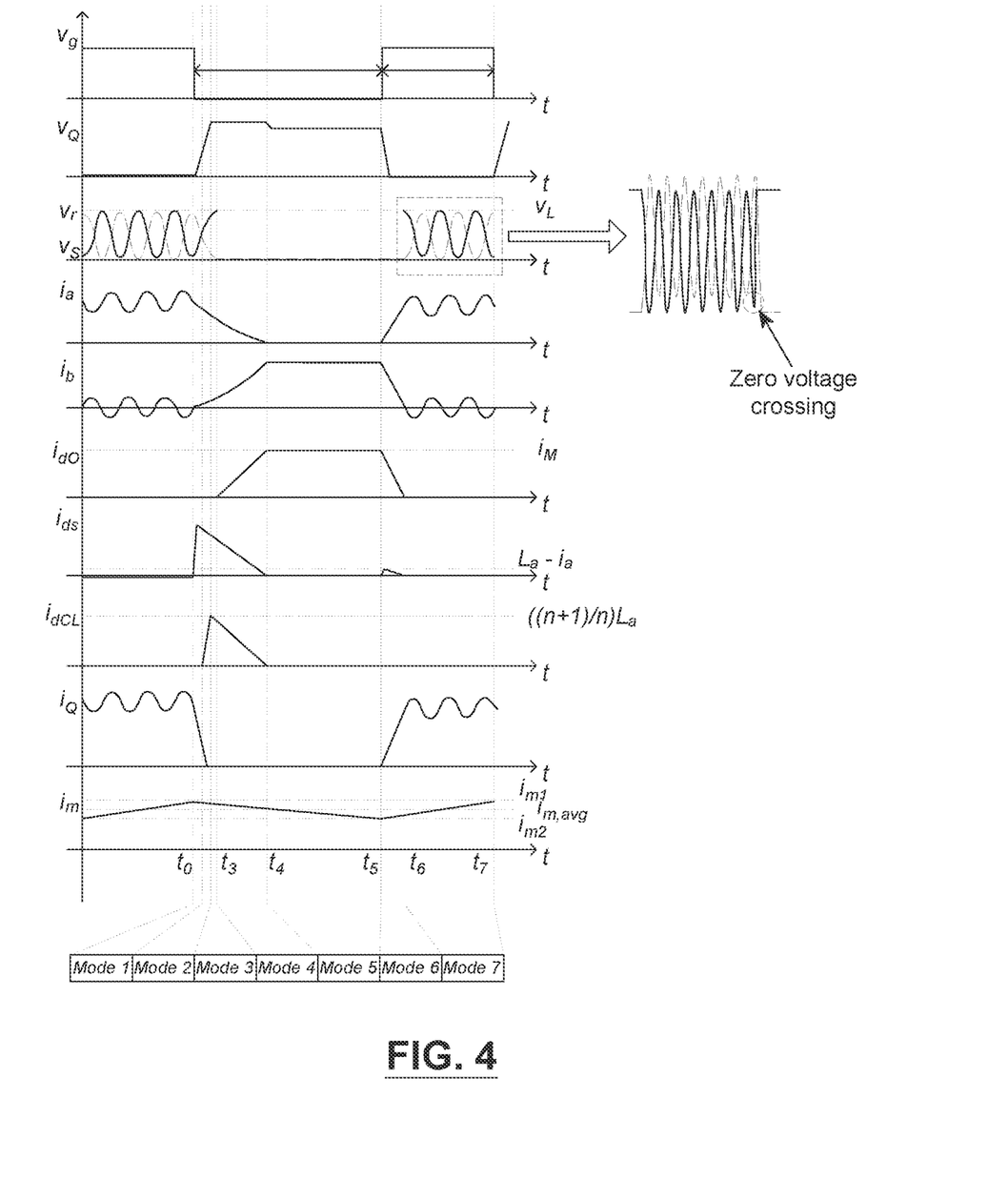
FIG. 4 exemplarily illustrates waveforms according to the switching operation of the tapped inductor boost converter.

FIG. 2 and FIG. 3 exemplarily illustrate a switching operation of the tapped inductor boost converter, and FIG. 4 exemplarily illustrates waveforms according to the switching operation of the tapped inductor boost converter.

Referring to FIGS. 2 to 4 together, the switching operation of the tapped inductor boost converter 100 may be divided into the first to the seventh modes. The switch Q is turned off in the first to fifth modes, and turned on in the sixth and seventh modes.

In the first mode, when the switch Q is turned off at time t0, the snubber capacitor $C_S$ is charged by the voltage of the input power supply 120, and a rising slope of a voltage $v_S$ across the snubber capacitor $C_S$ decreases. Through this, turn-off ZVS (Zero voltage switching) becomes possible. The first mode continues until a current $i_2$ flows through the clamp diode $D_{CL}$.

In the second mode, the recovery capacitor $C_r$ begins to discharge until the snubber capacitor $C_S$ is fully charged.

In the third mode, the snubber capacitor $C_S$ is fully charged, so the current $i_2$ becomes the sum of a current in and a current from the recovery capacitor $C_r$. The third mode continues until the recovery capacitor $C_r$ is completely discharged.

In the fourth mode, when the recovery capacitor $C_r$ is completely discharged, a current $i_a$ from the tap is output to the output terminal of the converter 100 through the snubber diode $D_S$ and the clamp diode $D_{CL}$, and a current $i_b$ from the output terminal of the tap inductor 110 is output to the output terminal of the converter 100 through the output diode $D_O$. In the fourth mode, the current $i_a$ is a residual current due to the leakage inductance $L_a$ of the tap inductor 110, and the current $i_b$ is a residual current due to the leakage inductance $L_b$. The fourth mode continues until the current $i_a$ becomes 0.

In the fifth mode, a current due to the magnetizing inductance $L_m$ operating in CCM (Continuous Current Mode) is output to the output terminal of the converter 100 through the output diode $D_O$. The fifth mode continues until switch Q is turned on.

In the sixth mode, when the switch Q is turned on, the current $i_b$ due to the leakage inductance $L_b$ of the tap inductor 110 reduces the rising slope of a current $i_Q$. Through this, turn-on ZCS becomes possible. The sixth mode continues until all residual charges in the output diode $D_O$ are discharged.

In the seventh mode, after all residual current due to leakage inductance flows to the load, a resonance occurs in the tapped inductor boost converter 100. When operating in the seventh mode, a resonance loop composed of the leakage inductances $L_a$ and $L_b$, the snubber capacitor $C_S$, the recovery capacitor $C_r$, the switch Q, the input power source 120, and the tap inductor 110 is formed in the tapped inductor boost converter 100. When the resonance occurs, the voltage $v_s$ increases and decreases repeatedly between substantially 0 and $v_r(V)$. Therefore, when the voltage $v_S$ applied across the switch Q reaches a ZVC (zero voltage crossing), a switching loss can be minimized by turning off the switch Q (hereinafter referred to as ZVC turn off).

FIG. 5 exemplarily illustrates a switch control circuit that controls the tapped inductor boost converter to turn off ZVC.

Referring to FIG. 5, the switch control circuit 130 outputs the second duty signal $v_g$ applied to the switch Q using the first duty signal $v_d$ output from a converter driver (not shown) and the voltage $v_S$ across the snubber capacitor $C_s$. The second duty signal $v_g$ is turn off (i.e., logically low) when the voltage $v_S$ reaches ZVC after the first duty signal $v_d$ is turned on (i.e., logically on) while the tapped inductor boost converter 100 is operating in the seventh mode.

For this purpose, the switch control circuit 130 may include an AND gate 131 that receives the inverted voltage $v_S$ and an inverted first duty signal $v_d$, and a latch 132 having a RESET terminal connected to an output terminal of the AND gate 131 and a SET terminal connected to the first duty signal $v_d$. While operating in the seventh mode, the switch control circuit 130 outputs the second duty signal $v_g$ that is substantially the same as the first duty signal $v_d$ in the first to sixth modes, and outputs the second duty signal $v_g$ when detecting that the first duty signal $v_d$ goes off and then detecting ZVC of the voltage $v_S$.

Figure 6:
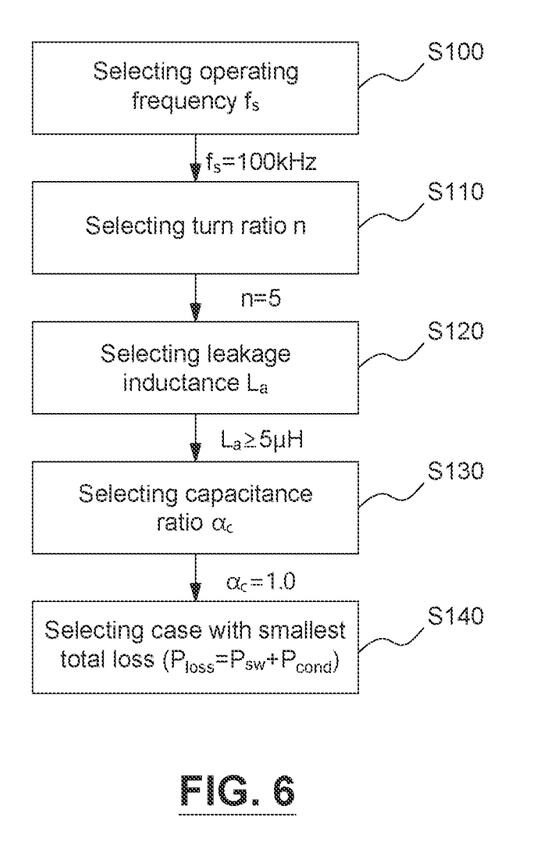
FIG. 6 is a flowchart illustrating the design process of a tapped inductor boost converter.
Figure 7A:
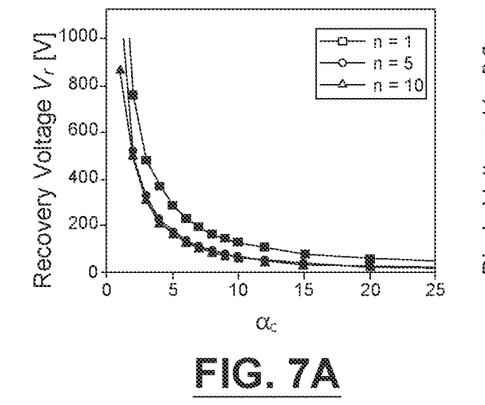
FIG. 7A, FIG. 7B, FIG. 7C and FIG. 7D are graphs showing the change in breakdown voltage according to changes in n and ac.
Figure 7B:
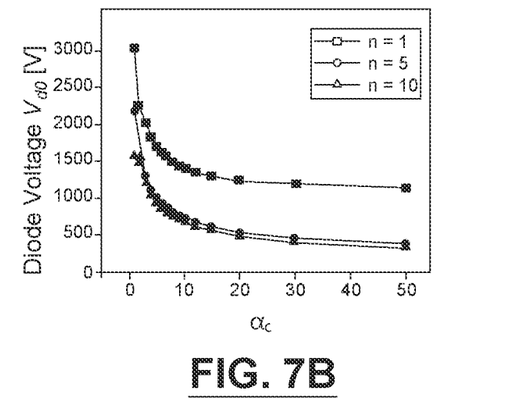
Figure 7C:
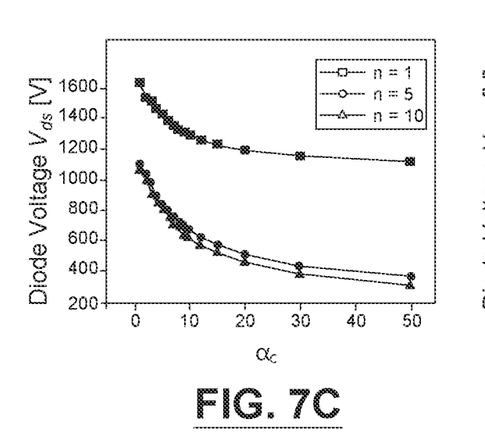
Figure 7D:
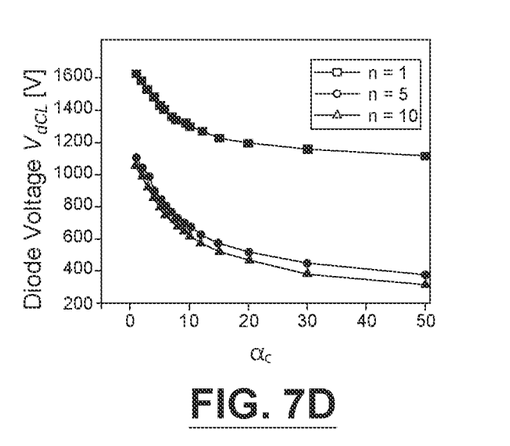

FIG. 6 is a flowchart illustrating the design process of a tapped inductor boost converter, FIG. 7A, FIG. 7B, FIG. 7C and FIG. 7D are graphs showing the change in breakdown voltage according to changes in n and $\alpha_c$, and FIG. 8A, FIG.

Figure 8A:
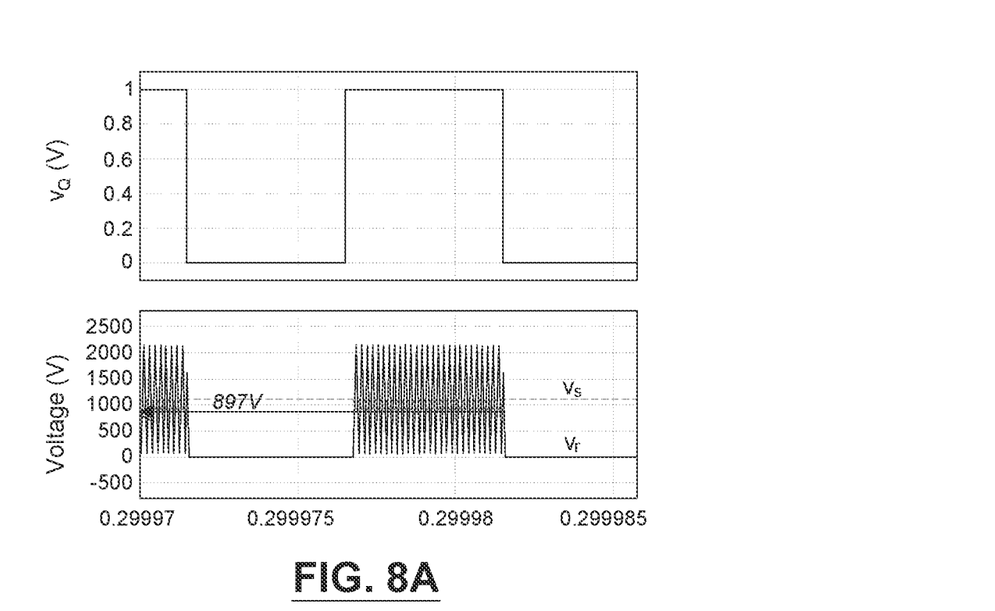
FIG. 8A, FIG. 8B, FIG. 8C and FIG. 8D are graphs showing the change in the minimum voltage crossing of the snubber capacitor according to changes in $\alpha_c$.
Figure 8B:
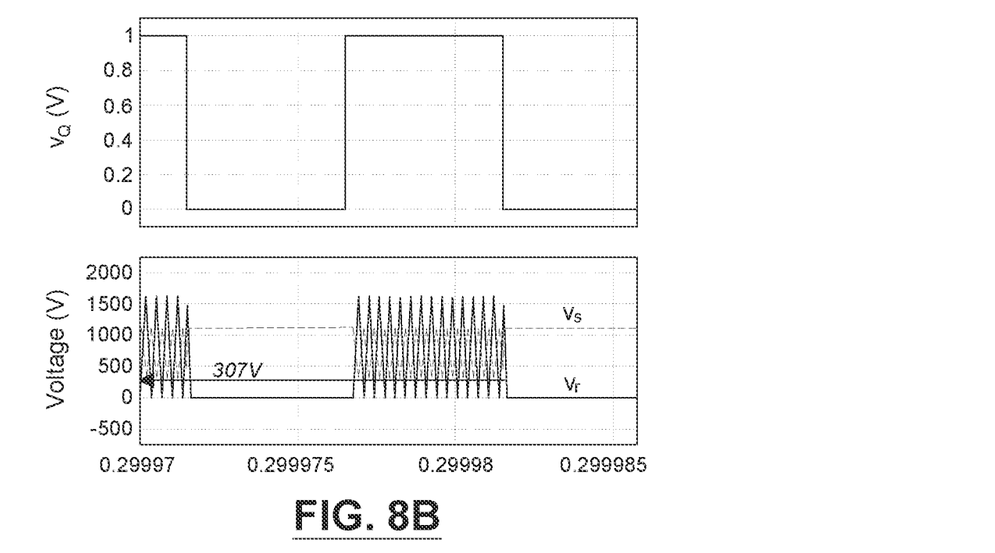
Figure 8C:
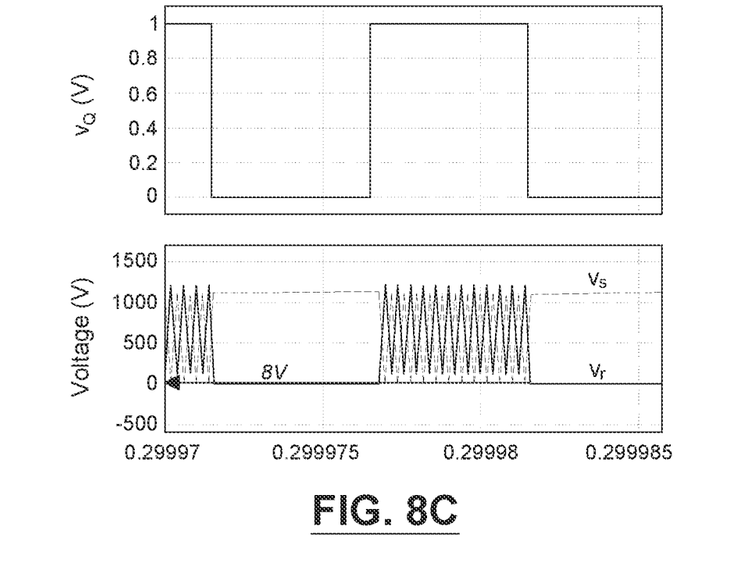
Figure 8D:
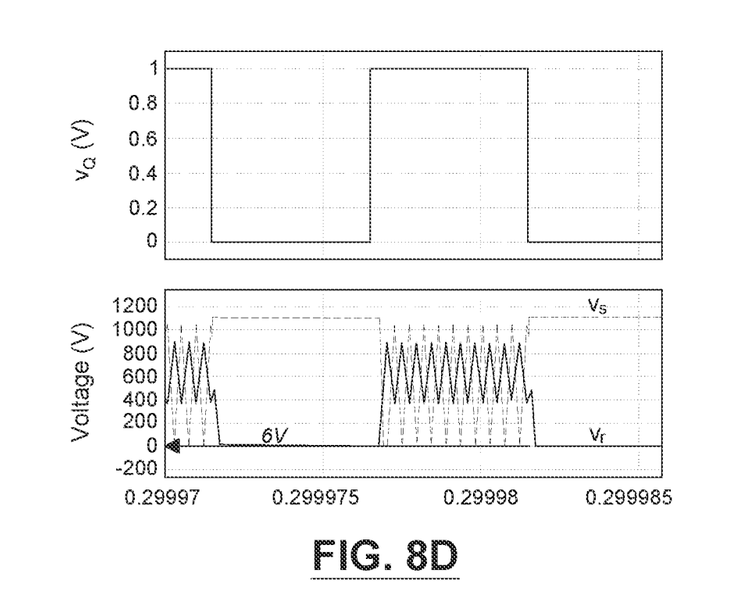

8B, FIG. 8C and FIG. 8D are graphs showing the change in the minimum voltage crossing of the snubber capacitor according to changes in $\alpha_c$.

Referring to FIG. 6, a design process is for optimally determining each parameter defining the converter 100 in operation.

The design process of the tap inductor boost converter 100 may consist of selecting an operating frequency $f_s$, and then selecting main parameters of the converter 100, namely, the first leakage inductance $L_a$, the second leakage inductance $L_b$, the snubber capacitance $C_s$, the recovery capacitance $C_r$, and the turn ratio n of the tap inductor 110.

In S100, the operating frequency $f_S$ may be selected to be about 100 kHz considering the characteristics of the SIC MOSFET used as switch Q.

In S110, the turn ratio n may be selected. The turn ratio n is a ratio of the inductor windings that determines the first leakage inductance $L_a$ and the second leakage inductance $L_b$ of the tap inductor 110. The turn ratio n may be selected in consideration of the voltage $v_r$ across the recovery capacitor $C_r$, the voltage VDS across the snubber diode $D_S$, the voltage $V_{DCL}$ across the clamping diode $D_{CL}$, and the voltage $V_{DO}$ across the output diode $D_O$. Increasing the turn ratio n has an advantage in its breakdown voltage.

Referring to FIG. 7A through FIG. 7D are graphs showing the change in breakdown voltage according to changes in n and $\alpha_c$, the turn ratio n is gradually increased to show the measured values of the voltage $v_r$ of the recovery capacitor $C_r$ and voltages across each diode. The increase in turn ratio n and the magnitude of the voltages applied to the recovery capacitor $C_r$ and each diode are inversely proportional. An increase in the voltage applied to the recovery capacitor $C_r$ and each diode may result in a decrease in power efficiency and power density due to an increase in device size and an increase in voltage stress caused by an increase in breakdown voltage. Therefore, as shown, considering the power density and efficiency due to the increase in turns ratio n, the saturated turn ratio n can be selected as 5. $\alpha_c$ selected as the X-axis is a ratio of the snubber capacitance $C_s$ and the recovery capacitance $C_r$. $\alpha_c$ is used to select the capacitance of S130, and the snubber capacitance $C_s$ is assumed to be approximately 1 nF.

Referring again to FIG. 6, in S120, the first leakage inductance $L_a$ and the second leakage inductance $L_b$ may be selected. A ratio of the first leakage inductance $L_a$ and the second leakage inductance $L_b$ may be automatically determined once the turn ratio n is selected in S110, according to the principle that a ratio of inductance is proportional to the square of the number of turns. The design process is carried out based on the first leakage inductance La. The first leakage inductance $L_a$ and the second leakage inductance $L_b$ are set as the minimum conditions for the leakage inductance through Equation 1 considering a duty resolution above a certain value of the resonance frequency $f_r$ in the resonance loop occurring in the seventh mode. A period T of the resonance frequency $f_r$ can be selected as a value less than 0.05 of a period $T_S$ of the operating frequency $f_s$. An upper limit of the first leakage inductance $L_a$ is selected through Equation 1, and Equation 1 may lead to Equation 2 that can comprehensively consider inductance, capacitance, and turn ratio by including the selection process of the snubber capacitance $C_s$ and the recovery capacitance $C_r$.

$$\frac{1}{fr} = T_r = 2\pi\sqrt{\left\{\left(\frac{n+1}{n}\right)^2 L_a + L_b\right\}(C_r//C_s)} < \qquad \text{(Equation 1)}$$

$$\frac{T_s}{20}\left(C_r//C_s = \frac{C_r C_s}{C_r + C_s}, L_b = \frac{L_a}{n^2}\right) -$$

$$\left(\frac{T_s}{40\pi}\right)^2 \left(\frac{1}{C_s} + \frac{1}{C_r}\right)\left(\frac{n}{n^2 + 2n + 2}\right) > L_a$$

In S130, in the process of selecting the snubber capacitance $C_s$ and the recovery capacitance $C_r$, whether ZVC of the voltage $v_S$ across the snubber capacitor $C_S$ for the operation of the switch control circuit 130 is reached is determined by the change in $\alpha_c$ with reference to FIGS. 8A through 8D. The snubber capacitance $C_S$ is selected as 1 nF as the initial condition. In FIGS. 8A through 8D, measurements were made while increasing $\alpha_c$ to find ZVC for operating the switch control circuit 130. FIG. 8A shows $v_S$ when $\alpha_c$=0.1, FIG. 8B shows $v_S$ when $\alpha_c$=0.5, FIG. 8C shows $v_S$ when $\alpha_c$=1.0, and FIG. 8D shows $v_S$ when $\alpha_c$=2.0. When $\alpha_c$=1.0 and $\alpha_c$=2.0, ZVC switching was detected at 8 V and 6 V instead of 0 V, but this is because the switching was made after discharging more than 99 percent of the charge in the snubber capacitor $C_S$, therefore these can be also considered as ZVC switching. $\alpha_c$ was selected as 1.0 to maximize the increase in power density.

In S130, a case with the smallest total loss may be selected based on the resonant frequency. Equation 2 expresses the resonance frequency $f_r$ in the seventh mode. By substituting the operating frequency $f_S$ selected in S100, the turn ratio n selected in S110, the ratio and conditions of the first leakage inductance $L_a$ and the second leakage inductance $L_b$ selected in S120, and the ratio $\alpha_c$ of the snubber capacitance $C_s$ and the recovery capacitance $C_r$ selected in S130 into Equation 2, parameter values for implementing the smallest switching loss can be obtained among the parameter values that satisfy Equation 2.

$$w = \frac{1}{\sqrt{\left\{\left(\frac{n+1}{n}\right)^2 L_a + L_b\right\}(C_r // C_s)}} \qquad \text{(Equation 2)}$$

By selecting parameter values that satisfy Equation 2 according to the conditions selected in S100 to S130, the parameter values for the lowest switching loss can be selected. The total loss $P_{loss}$=$P_{sw}$ (switching loss)+$P_{cond}$ (conduction loss) when applying the example of possible cases is shown in Table below.

| Parameter | Case1 | Case2 | Case3 | Case4 | Case5 |
|---|---|---|---|---|---|
| n | 5 | 5 | 5 | 5 | 5 |
| $L_a$ | 5 μH | 4.5 μH | 4 μH | 3.5 μH | 3 μH |
| $L_b$ | 1 μH | 0.9 μH | 0.8 μH | 0.7 μH | 0.6 μH |
| $C_s$ | 1.5 nF | 1.7 nF | 1.9 nF | 2.2 nF | 2.5 nF |
| $C_r$ | 1.5 nF | 1.7 nF | 1.9 nF | 2.2 nF | 2.5 nF |
| $P_{loss} = P_{sw} + P_{cond}$ | 0.0813 W | 0.1011 W | 0.1023 W | 0.1040 W | 0.1058 W |

In Table, the first leakage inductance $L_a$=5 μH is the highest among the values selected in S120, and as the first leakage inductance $L_a$ decreases, the total loss value increases, so Case 1 is finally adopted.

The above description of the invention is exemplary, and those skilled in the art can understand that the invention can be modified in other forms without changing the technical concept or the essential feature of the invention. Therefore, it should be understood that the above-mentioned embodiments are exemplary in all respects, but are not definitive.

The scope of the invention is defined by the appended claims, not by the above detailed description, and it should be construed that all changes or modifications derived from the meanings and scope of the claims and equivalent concepts thereof are included in the scope of the invention.

What is claimed is:

1. A tapped inductor boost converter, comprising:
   a tapped inductor, having a primary winding, one end of which is connected to an input power source, a secondary winding connected between the other end of the primary winding and an output terminal of the tapped inductor, and a tap connected to a contact point of the primary winding and the secondary winding;
   a switch, configured for connecting or disconnecting a current path between the tap and ground;
   a switch control circuit, configured for detecting a zero voltage crossing during resonance with a first duty signal and a voltage across the switch, and outputting a second duty signal that turns off the switch;
   a snubber circuit connected in parallel with the switch;
   a clamping diode, configured for providing a forward current path from an output terminal of the snubber circuit to an output terminal of the tapped inductor boost converter;
   an output diode, configured for providing a forward current path from the output terminal of the tapped inductor to the output terminal of the converter output terminal; and
   a recovery capacitor connected between the output terminal of the tapped inductor and the output terminal of the snubber circuit,
   wherein the switch control circuit comprises:
   an AND gate, configured for receiving an inverted voltage across the snubber capacitor and an inverted first duty signal; and
   a latch having a RESET terminal connected to an output terminal of the AND gate and a SET terminal that receives the first duty signal.

2. The tapped inductor boost converter of claim 1, wherein the resonance occurs when the switch is turned on, wherein when the first duty signal is turned off during the resonance, the switch control circuit outputs the second duty signal that is turned off at the zero voltage crossing.

3. The tapped inductor boost converter of claim 1, wherein the snubber circuit comprises:
   a snubber diode, configured for providing a forward current path from the tap to the output terminal of the snubber circuit; and
   a snubber capacitor connected in series to the snubber diode.

4. The tapped inductor boost converter of claim 3, wherein a turn ratio of the tapped inductor is 5, wherein a capacitance ratio between the snubber capacitor and the recovery capacitor is 1.

5. The tapped inductor boost converter of claim 3, wherein the tapped inductor boost converter performs zero current switching when the switch is turned on and zero voltage switching when the switch is turned off.

* * * * *